(12) United States Patent
Derelöv

(10) Patent No.: US 9,945,121 B2
(45) Date of Patent: Apr. 17, 2018

(54) PANELS COMPRISING A MECHANICAL LOCKING DEVICE AND AN ASSEMBLED PRODUCT COMPRISING THE PANELS

(71) Applicant: Välinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 15/366,704

(22) Filed: Dec. 1, 2016

(65) Prior Publication Data

US 2017/0159291 A1 Jun. 8, 2017

(30) Foreign Application Priority Data

Dec. 3, 2015 (SE) ...................................... 1551591

(51) Int. Cl.
 *E04B 2/08* (2006.01)
 *E04C 2/38* (2006.01)
 *E04C 2/40* (2006.01)

(52) U.S. Cl.
 CPC . *E04C 2/38* (2013.01); *E04C 2/40* (2013.01)

(58) Field of Classification Search
 CPC ..................................... E04C 2/38; E04C 2/40
 See application file for complete search history.

(56) References Cited

U.S. PATENT DOCUMENTS

| | | | |
|---|---|---|---|
| 291,032 A | 1/1884 | Cleland | |
| 634,581 A | 10/1899 | Miller | |
| 701,000 A | 5/1902 | Ahrens | |
| 861,911 A | 7/1907 | Stewart | |
| 881,673 A | 3/1908 | Ellison | |
| 1,534,468 A | 4/1925 | Shea, Jr. | |
| 1,954,242 A | 4/1934 | Heppenstall | |
| 2,360,451 A | 10/1944 | Stone | |

(Continued)

FOREIGN PATENT DOCUMENTS

| | | |
|---|---|---|
| CH | 685 276 A5 | 5/1995 |
| CH | 696 889 A5 | 1/2008 |

(Continued)

OTHER PUBLICATIONS

U.S. Appl. No. 14/158,165, filed Jan. 17, 2014, Peter Derelöv.

(Continued)

*Primary Examiner* — Patrick J Maestri
(74) *Attorney, Agent, or Firm* — Buchanan Ingersoll & Rooney P.C.

(57) ABSTRACT

A set of panels including a first panel, a second, and a locking device. The locking device includes an edge groove at the first edge and a tongue groove at the second edge. The edge groove includes a flexible tongue arranged in an insertion groove at a first side of the edge groove. The edge groove includes a first groove surface at a first side of the insertion groove and a second groove surface at a second side of the insertion groove. The second edge includes a first edge surface at a first side of the tongue groove and a second edge surface at a second side of the tongue groove. The locking device is configured to be unlocked by inserting a tool in the tongue groove. The first groove surface is arranged offset in a second direction relative to the second groove surface by a first distance.

18 Claims, 8 Drawing Sheets

(56) References Cited

U.S. PATENT DOCUMENTS

| | | | |
|---|---|---|---|
| 2,362,904 A | 11/1944 | Kramer | |
| 2,496,184 A | 1/1950 | Von Canon | |
| 3,195,968 A | 7/1965 | Freeman | |
| 3,284,152 A | 11/1966 | Schörghuber | |
| 3,347,610 A | 10/1967 | Pilliod | |
| 3,410,441 A | 11/1968 | Rhyne | |
| 3,722,704 A | 3/1973 | Piretti | |
| 3,722,971 A | 3/1973 | Zeischegg | |
| 3,784,271 A | 1/1974 | Schreiber | |
| 3,885,845 A | 5/1975 | Krieks | |
| 4,089,614 A | 5/1978 | Harley | |
| 4,099,887 A | 7/1978 | Mackenroth | |
| 4,116,510 A | 9/1978 | Franco | |
| 4,142,271 A | 3/1979 | Busse | |
| 4,279,397 A | 7/1981 | Larsson | |
| 4,509,648 A | 4/1985 | Govang | |
| 4,597,122 A | 7/1986 | Handler | |
| 4,750,794 A | 6/1988 | Vegh | |
| 4,752,150 A | 6/1988 | Salice | |
| 4,883,331 A | 11/1989 | Mengel | |
| 4,886,326 A | 12/1989 | Kuzyk | |
| 4,909,581 A | 3/1990 | Haheeb | |
| 5,004,116 A | 4/1991 | Cattarozzi | |
| 5,114,265 A | 5/1992 | Grisley | |
| 5,209,556 A | 5/1993 | Anderson | |
| 5,212,925 A | 5/1993 | McClinton | |
| 5,360,121 A | 11/1994 | Sothman | |
| 5,475,960 A | 12/1995 | Lindal | |
| 5,499,886 A | 3/1996 | Short et al. | |
| 5,527,103 A | 6/1996 | Pittman | |
| 5,658,086 A | 8/1997 | Brokaw et al. | |
| 5,893,617 A | 4/1999 | Lee | |
| 5,950,389 A | 9/1999 | Porter | |
| 6,413,007 B1 | 7/2002 | Lambright | |
| 6,505,452 B1 | 1/2003 | Hannig | |
| 6,675,979 B2 | 1/2004 | Taylor | |
| 6,769,219 B2 | 8/2004 | Schwitte et al. | |
| 6,827,028 B1 | 12/2004 | Callaway | |
| 7,451,535 B2 | 11/2008 | Wells et al. | |
| 7,451,578 B2 | 11/2008 | Hannig | |
| 7,584,583 B2 | 9/2009 | Bergelin et al. | |
| 7,621,092 B2 | 11/2009 | Groeke et al. | |
| 7,641,414 B1 | 1/2010 | Joyce | |
| 7,721,503 B2 | 5/2010 | Pervan et al. | |
| 7,818,939 B2 | 10/2010 | Bearinger | |
| 7,998,549 B2 | 8/2011 | Susnjara | |
| 8,038,363 B2 | 10/2011 | Hannig | |
| 8,042,311 B2 | 10/2011 | Pervan | |
| 8,220,217 B2 | 7/2012 | Muehlebach | |
| 8,365,499 B2 | 2/2013 | Nilsson et al. | |
| 8,387,327 B2 | 3/2013 | Pervan | |
| 8,495,849 B2 | 7/2013 | Pervan | |
| 8,505,257 B2 | 8/2013 | Boo et al. | |
| 8,544,230 B2 * | 10/2013 | Pervan | E04F 15/04 428/50 |
| 8,615,952 B2 | 12/2013 | Engström | |
| 8,745,952 B2 | 6/2014 | Perra | |
| 8,764,137 B2 | 7/2014 | Fehre | |
| 8,833,028 B2 | 9/2014 | Whispell et al. | |
| 8,887,468 B2 | 11/2014 | Håkansson et al. | |
| 9,175,703 B2 | 11/2015 | Maertens | |
| 9,290,948 B2 | 3/2016 | Cappelle et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 * | 7/2017 | Derelov | F16L 35/0614 |
| 9,723,923 B2 | 8/2017 | Derelöv | |
| 9,726,210 B2 | 8/2017 | Derelöv et al. | |
| 2002/0170258 A1 | 11/2002 | Schwitte et al. | |
| 2006/0101769 A1 | 5/2006 | Pervan et al. | |
| 2006/0273085 A1 | 12/2006 | Casto | |
| 2007/0006543 A1 | 1/2007 | Engström | |
| 2008/0066415 A1 | 3/2008 | Pervan | |
| 2008/0216435 A1 | 9/2008 | Nolan | |
| 2008/0236088 A1 | 10/2008 | Hannig et al. | |
| 2010/0083603 A1 | 4/2010 | Goodwin | |
| 2010/0173122 A1 | 7/2010 | Susnjara | |
| 2010/0289389 A1 | 11/2010 | Crabtree, II | |
| 2011/0225921 A1 | 9/2011 | Schulte | |
| 2011/0225922 A1 | 9/2011 | Pervan et al. | |
| 2011/0280655 A1 | 11/2011 | Maertens | |
| 2011/0283650 A1 | 11/2011 | Pervan et al. | |
| 2012/0009383 A1 | 1/2012 | Hardesty | |
| 2012/0027967 A1 | 2/2012 | Maertens | |
| 2012/0073235 A1 | 3/2012 | Hannig | |
| 2012/0124932 A1 | 5/2012 | Schulte et al. | |
| 2012/0145845 A1 | 6/2012 | Hightower | |
| 2012/0180416 A1 | 7/2012 | Perra et al. | |
| 2012/0279161 A1 | 11/2012 | Håkansson et al. | |
| 2012/0286637 A1 | 11/2012 | Fehre | |
| 2013/0014463 A1 | 1/2013 | Pervan | |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0097846 A1 | 4/2013 | Pettigrew | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2014/0055018 A1 | 2/2014 | Shein et al. | |
| 2014/0286701 A1 | 9/2014 | Sauer | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0230600 A1 | 8/2015 | Schulte | |
| 2015/0368896 A1 | 12/2015 | Schulte | |
| 2016/0000220 A1 | 1/2016 | Devos | |
| 2016/0007751 A1 | 1/2016 | Derelöv | |
| 2016/0145029 A1 | 5/2016 | Ranade et al. | |
| 2016/0174704 A1 | 6/2016 | Boo et al. | |
| 2016/0192775 A1 | 7/2016 | Andersson | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |

FOREIGN PATENT DOCUMENTS

| | | |
|---|---|---|
| CH | 698 988 B1 | 12/2009 |
| CN | 203424576 U | 2/2014 |
| DE | 26 35 237 A | 2/1978 |
| DE | 20 2009 008 825 U1 | 10/2009 |
| DE | 10 2009 041 142 A1 | 3/2011 |
| DE | 10 2014 110 124 A1 | 1/2016 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 650 375 A1 | 4/2005 |
| EP | 1 048 423 B9 | 5/2005 |
| EP | 1 671 562 A1 | 6/2006 |
| EP | 1 922 954 A1 | 5/2008 |
| EP | 1 922 954 B1 | 7/2009 |
| EP | 2 333 353 A2 | 6/2011 |
| EP | 3 031 998 A1 | 6/2016 |
| FR | 2 062 731 A5 | 6/1971 |
| FR | 2 517 187 A | 6/1983 |
| GB | 2 482 213 A | 1/2012 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |

(56) References Cited

FOREIGN PATENT DOCUMENTS

| | | |
|---|---|---|
| WO | WO 02/055809 A1 | 7/2002 |
| WO | WO 02/055810 A1 | 7/2002 |
| WO | WO 03/016654 A1 | 2/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/108114 A1 | 7/2014 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |

OTHER PUBLICATIONS

U.S. Appl. No. 14/486,681, filed Sep. 15, 2014, Hans Brännström.
U.S. Appl. No. 14/573,473, filed Dec. 17, 2014, Peter Derelöv.
U.S. Appl. No. 14/573,572, filed Dec. 17, 2014, Christian Boo.
U.S. Appl. No. 14/972,949, filed Dec. 17, 2015, Christian Boo.
U.S. Appl. No. 15/171,403, filed Jun. 2, 2016, Peter Derelöv.
U.S. Appl. No. 15/271,622, filed Sep. 21, 2016, Peter Derelöv.
U.S. Appl. No. 15/308,872, filed Nov. 4, 2016, Darko Pervan.
U.S. Appl. No. 15/379,791, filed Dec. 15, 2016, Nidas Håkansson.
U.S. Appl. No. 15/415,356, filed Jan. 25, 2017, Peter Derelöv.
U.S. Appl. No. 15/422,798, filed Feb. 2, 2017, Magnus Fridlund.
U.S. Appl. No. 15/428,469, filed Feb. 9, 2017, Magnus Fridlund
U.S. Appl. No. 14/428,504, filed Feb. 9, 2017, Christian Boo.
U.S. Appl. No. 15/432,190, filed Feb. 14, 2017, Magnus Fridlund.
U.S. Appl. No. 15/271,622, Derelöv.
U.S. Appl. No. 15/308,872, Pervan.
U.S. Appl. No. 15/379,791, Håkansson, et al.
U.S. Appl. No. 15/415,356, Derelöv, et al.
U.S. Appl. No. 15/422,798, Fridlund.
U.S. Appl. No. 15/428,469, Fridlund.
U.S. Appl. No. 15/428,504, Boo.
U.S. Appl. No. 15/432,190, Fridlund.
Derelöv, Peter, et al., U.S. Appl. No. 15/271,622 entitled "Panels Comprising Mechanical Locking Device and an Assembled Product Comprising the Panels", filed Sep. 21, 2016.
Pervan, Darko, U.S. Appl. No. 15/308,872 entitled "Mechanical Locking System for Building Panels," filed Nov. 4, 2016.
Håkansson, Niclas, et al., U.S. Appl. No. 15/379,791 entitled "Mechanical Locking System for Building Panels," filed Dec. 15, 2016.
Derelöv, Peter, et al., U.S. Appl. No. 15/415,356 entitled "Panels Comprising a Mechanical Locking Device and an Assembled Product Comprising the Panels", filed Jan. 25, 2017.
Fridlund, Magnus, U.S. Appl. No. 15/422,798 entitled "Set of Panels for an Assembled Product," filed Feb. 2, 2017.
Fridlund, Magnus, U.S. Appl. No. 15/428,469 entitled "Element and Method for Providing Dismantling Groove," filed Feb. 9, 2017.
Boo, Christian, U.S. Appl. No. 15/425,504 entitled "Set of Panel-Shaped Elements for a Composed Element," filed Feb. 9, 2017.
Fridlund, Magnus, U.S. Appl. No. 15/432,190 entitled "Method for Forming a Panel," filed Feb. 14, 2017.
U.S. Appl. No. 15/642,757, filed Jul. 6, 2017, Peter Derelöv.
U.S. Appl. No. 15/584,633, filed May 2, 2017, Christian Boo.
U.S. Appl. No. 15/646,714, filed Jul. 11, 2017, Peter Derelöv.
U.S. Appl. No. 15/562,254, filed Sep. 27, 2017, Peter Derelöv.
U.S. Appl. No. 15/567,507, filed Oct. 18, 2017, Christian Boo, Peter Derelöv and Agne Pålsson.
U.S. Appl. No. 15/794,491, filed Oct. 26, 2017, Peter Derelöv.
U.S. Appl. No. 15/584,633, Boo.
U.S. Appl. No. 15/646,714, Derelöv et al.
U.S. Appl. No. 15/562,254, Derelöv.
U.S. Appl. No. 15/567,507, Boo et al.
U.S. Appl. No. 15/794,491, Derelöv.
International Search Report/Written Opinion dated Feb. 21, 2017 in PCT/SE2016/051197, ISA/SE, Patent-och registreringsverket, Stockholm, Sweden,18 pages.
Boo, Christian, et al., U.S. Appl. No. 15/584,633 entitled "Panels Comprising a Mechanical Locking Device and an Assembled Product Comprising the Panels", filed May 2, 2017.
Derelöv, Peter, et al., U.S. Appl. No. 15/646,714 entitled "Assembled Product and a Method of Assembling the Product", filed Jul. 11, 2017.
Derelöv, Peter, U.S. Appl. No. 15/562,254 entitled "Panel with a Slider", filed Sep. 27, 2017.
Boo, Christian, et al., U.S. Appl. No. 15/567,507 entitled "Panel With a Fastening Device," filed Oct. 18, 2017.
Derelöv, Peter. U.S. Appl. No. 15/794,491 entitled "Set of Panels with a Mechanical Locking Device", filed Oct. 26, 2017.
Fransson, Jonas, et al., U.S. Appl. No. 15/848,164 entitled "Device for Inserting a Tongue", filed Dec. 20, 2017.

\* cited by examiner

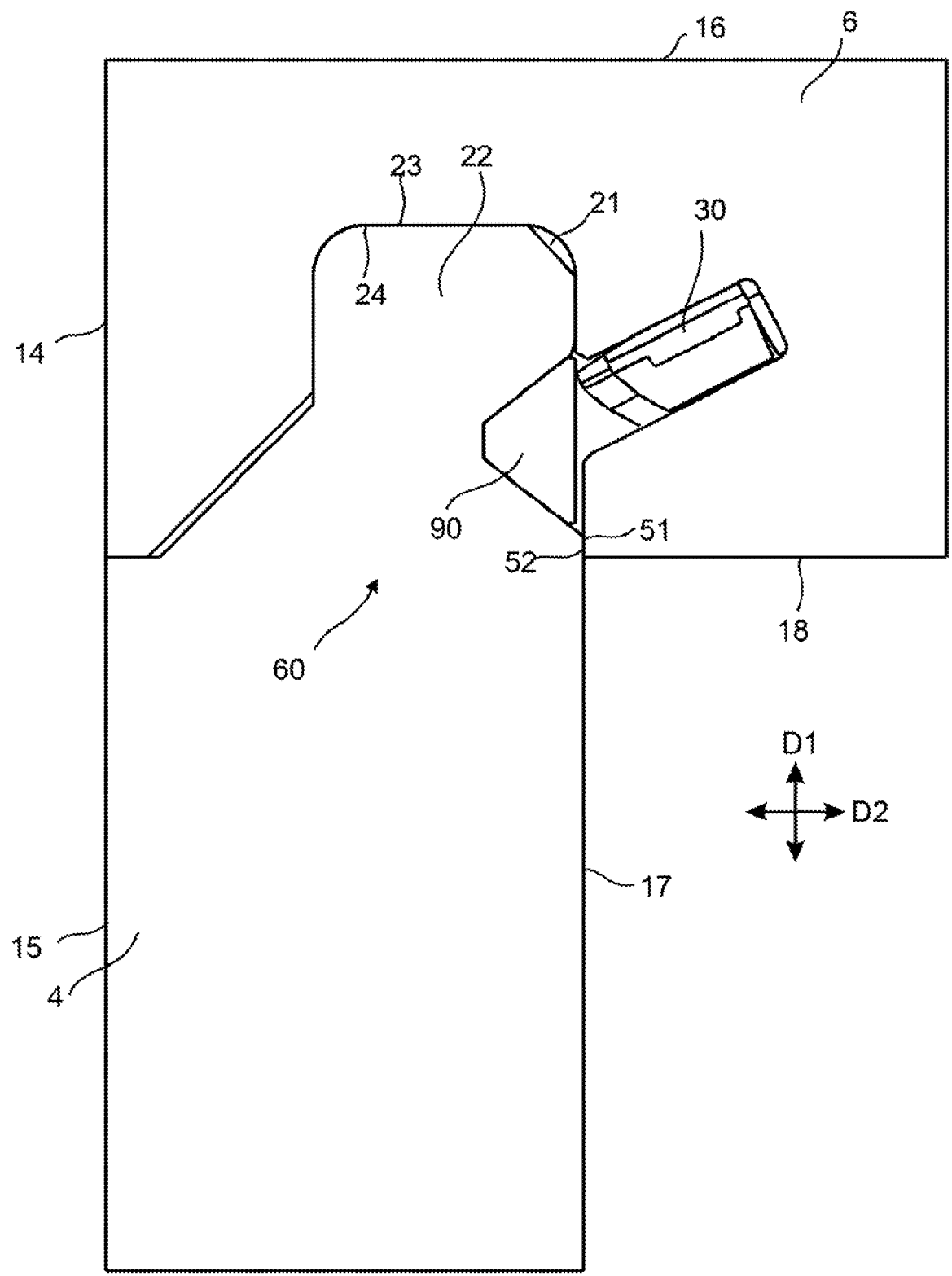

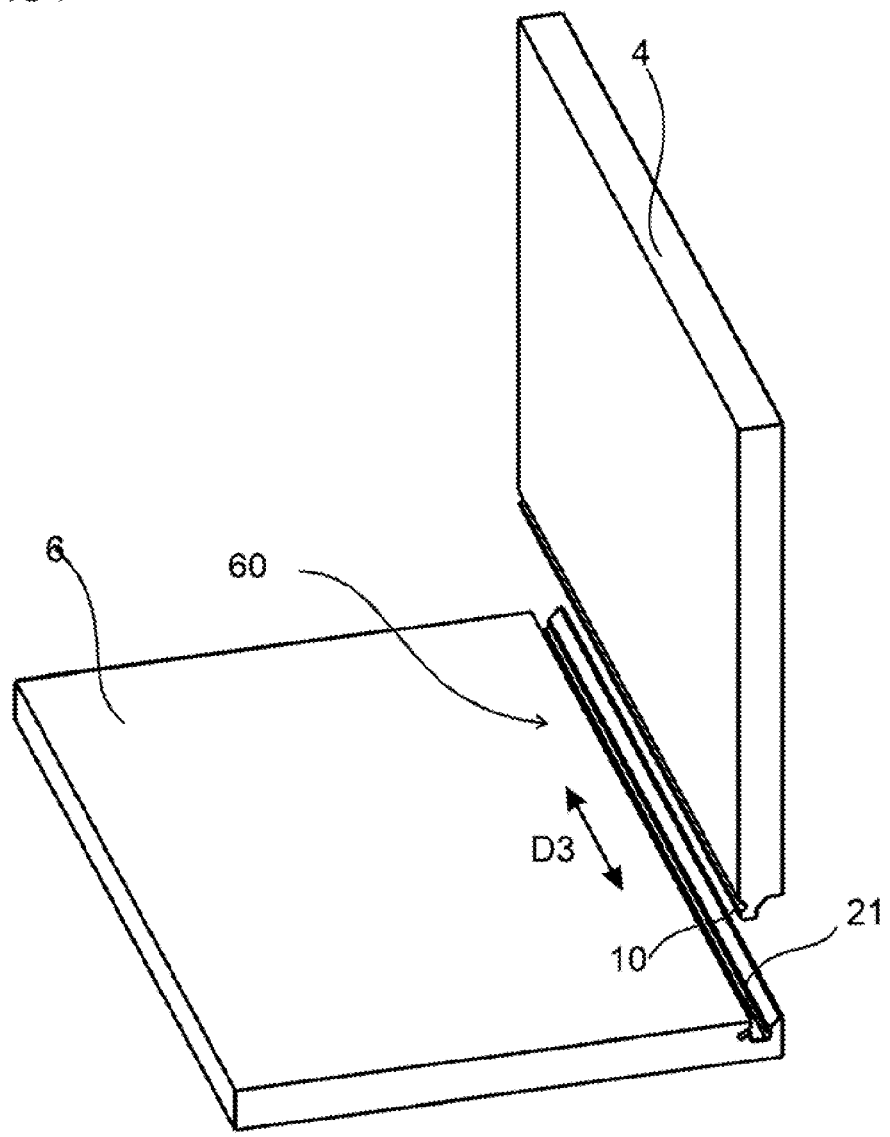

PANELS COMPRISING A MECHANICAL LOCKING DEVICE AND AN ASSEMBLED PRODUCT COMPRISING THE PANELS

TECHNICAL FIELD

The present disclosure relates to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The mechanical locking device may comprise a flexible tongue.

BACKGROUND

A furniture product provided with a mechanical locking device is known in the art, as evidenced by WO 2015/038059. The furniture product comprises a first panel connected perpendicular to a second panel by a mechanical locking device comprising a flexible tongue in an insertion groove.

SUMMARY

One object of certain embodiments of the present disclosure is to provide an improvement over the above described technique and the known art. A specific objective is to improve disassembling of panels, such as furniture panels, locked together by a mechanical locking device. The panels may be a part of a furniture product, such as a furniture component, a drawer, a cupboard, a bookshelf, a wardrobe, a kitchen fixture, and a box.

At least some of these and other objects and advantages that will be apparent from the description have been achieved by a first aspect of the present disclosure that includes a set of panels comprising a first panel having a first main plane and a second panel having a second main plane, wherein the first panel and the second panel comprise a locking device for locking a first edge of the first panel to a second edge of the second panel. The first main plane is essentially perpendicular to the second main plane in locked position of the first panel and the second panel. The locking device comprises an edge groove at the first edge and a tongue groove at the second edge. The edge groove comprises an insertion groove at a first side of the edge groove and a flexible tongue is arranged in the insertion groove. Said flexible tongue is configured to cooperate with the tongue groove for locking together the first edge and the second edge in a first direction, which is perpendicular to the first main plane. Said first side of the edge groove comprises a first groove surface at a first side of the insertion groove and a second groove surface at a second side of the insertion groove. A first side of said second edge comprises a first edge surface at a first side of the tongue groove and a second edge surface at a second side of the tongue groove. The first groove surface and the first edge surface are configured to cooperate for locking the first edge and the second edge in a second direction, which is perpendicular to the second main plane. The second groove surface and the second edge surface are configured to cooperate for locking the first edge and the second edge in the second direction. Said locking device is configured to be unlocked by inserting a tool in the tongue groove. The first groove surface is arranged offset in the second direction relative to the second groove surface by a first distance. This configuration may facilitate disassembling of the first panel and the second panel since the tool may be easier to insert into the tongue groove.

The first edge surface may be arranged offset in the second direction relative to the second surface by a second distance, which is preferably essentially the same as the first distance.

The first distance is in the range of about 0.1 mm to about 0.4 mm. Preferably, the first distance is about 0.2 mm, such as within 10% of 0.2 mm.

The first groove surface and the first edge surface are preferably parallel and may extend parallel to the second main plane.

The second groove surface and the second edge surface are preferably parallel and may extend parallel to the second main plane.

The edge groove may comprise, at a second side that is opposite to the first side, a third groove surface, which is configured to cooperate with a third edge surface of the second edge for locking the first edge and the second edge in the second direction. The third groove surface and the third edge surface are preferably parallel and may extend parallel to the second main plane The first groove surface may be configured to extend partly over the tongue groove. This configuration may have the advantage that a part of the first groove surface which extends over the tongue groove may work as a guiding surface for the tool during an insertion of the tool into the tongue groove. This may also result in a larger tongue groove and a tool with a larger crosscut area. A larger crosscut area may have the effect of a stronger and stiffer tool, which may facilitate the insertion of the tool in the tongue groove.

The first edge surface may be a bottom surface of a recess at the second edge, and is positioned in a locked position of the first panel and the second panel adjacent a first side of an opening of the edge groove. A side surface of the recess may be configured to cooperate with a first main surface of the first panel.

The first edge surface may be at a first main surface of the second panel.

A bottom surface of the edge groove may be configured to cooperate with an outer edge surface of the second edge for locking in the first direction.

The locking device may comprise cooperating surfaces at a second side of the opening of the edge groove, preferably at an outer edge surface at an outer corner of the first panel and at the second panel, respectively, in a locked position.

The locking device may be configured such that a space is obtained between an outer surface of the tool and the first groove surface when the tool is inserted in the tongue groove. A play between the outer surface of the tool and the groove surface is preferably essentially the same as the first distance. For example, the play may be in the range of about 0.1 mm to about 0.4 mm, and may be about 0.2 mm, such as within 10% of 0.2 mm. The outer surface of the tool is preferably inline with the second edge surface when the tool is inserted into the tongue groove. The outer surface of the tool may alternatively be positioned, in the second direction, between the first edge surface and the second edge surface.

The locking device may comprise a bevel or rounding at an opening of the tongue groove. The bevel or rounding may further facilitate disassembling, as the bevel or the rounding may prevent that the flexible tongue from getting stuck during the disassembling, particularly for the case when the play is somewhat too small, such as less than 0.1 mm, due to production tolerances being too large.

A cross section of the tool may have essentially the same shape as a cross section of the tongue groove.

The locking device is preferably configured such that the flexible tongue moves out of the tongue groove when the tool is inserted into the tongue groove, and the flexible tongue is pushed back into the insertion groove.

The edge groove may have a length which is essentially the same as a width of the first panel.

A part of the second edge, which is configured to be inserted into the edge groove, may have a length which is essentially the same as a width of the second panel.

The flexible tongue may be displaceable in the insertion groove.

The first panel and the second panel are preferably configured to be assembled by displacing the first panel relative the second panel in the first direction, wherein the first panel is perpendicular to the second panel. The second edge is inserted into the edge groove, wherein the flexible tongue is pushed back into the insertion groove and springs back into the tongue groove to obtain a locked position of the first panel and the second panel.

The flexible tongue may be designed according to the flexible tongue described and shown in FIGS. 2A-2F of WO2015/105449, which are hereby expressly incorporated by reference herein.

The insertion groove may have a length which is essentially the same as the length of the edge groove.

Some or all features that facilitate unlocking by may be combined in one embodiment to improve the unlocking.

The set of panels may be furniture panels.

A second aspect of the present disclosure includes a set of panels as described above and a tool configured to unlock the locking device by inserting the tool in the tongue groove.

A third aspect of the present disclosure includes an assembled furniture product comprising a corner of a frame comprising the set of panels as described above.

A core material of the first panel and/or the second panel may comprises a wood fibre based board, such as a HDF, MDF, plywood, solid wood or particleboard, or a reinforced plastic board or a wood fibre composite board.

The core may be provided with a decorative layer.

BRIEF DESCRIPTION OF THE DRAWINGS

Embodiments of the present disclosure will by way of example be described in more detail with reference to the appended schematic drawings, in which:

FIG. 5 shows an embodiment comprising the first panel and the second panel during unlocking with an embodiment of the tool inserted into an embodiment of the tongue groove.

FIG. 7 shows an embodiment comprising the first panel and the second panel in an unlocked position and before assembling.

DETAILED DESCRIPTION

Figure 1:
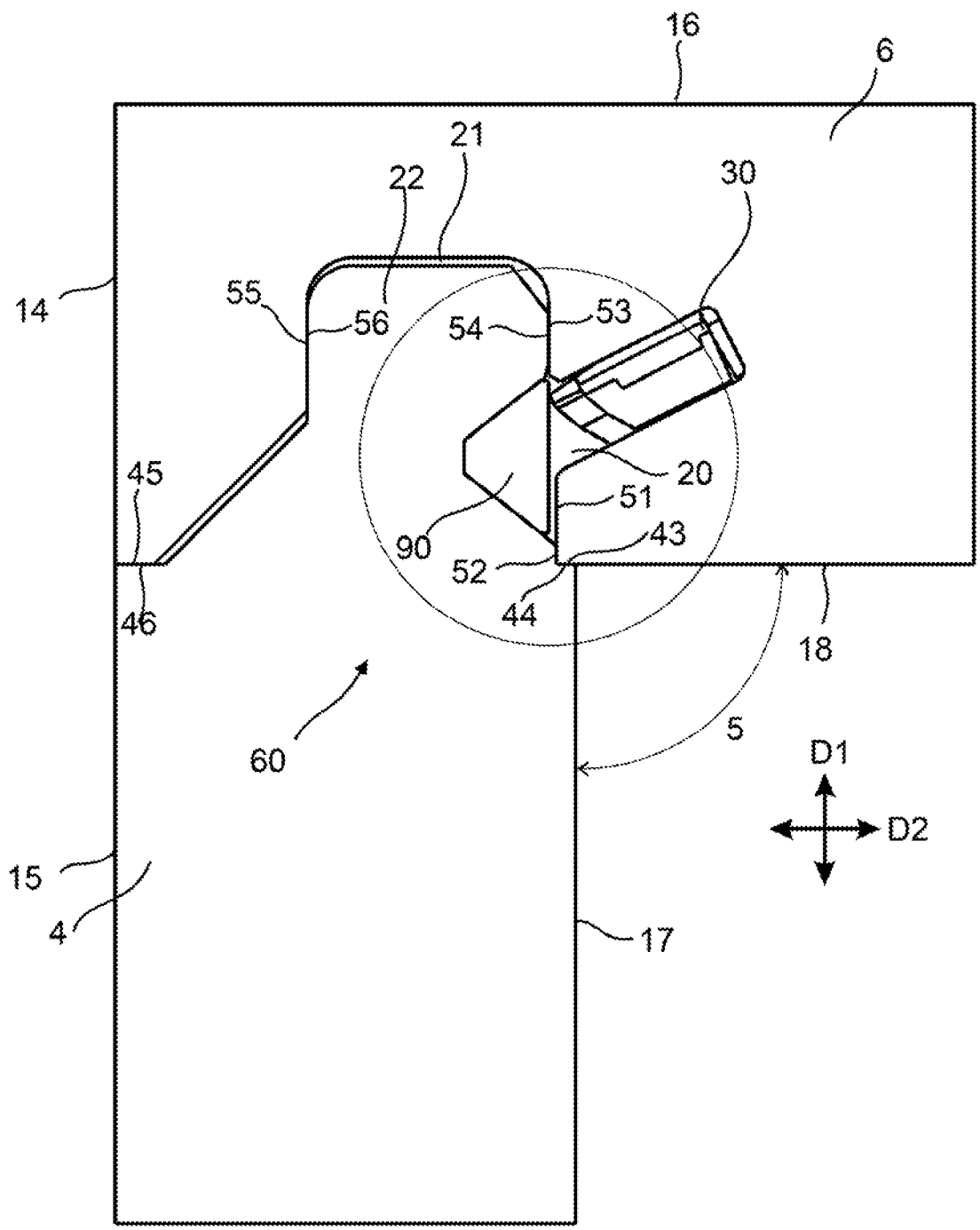
FIG. 1 shows an embodiment comprising the first panel and the second panel during unlocking with an embodiment of the tool inserted into an embodiment of the tongue groove.
Figure 2:
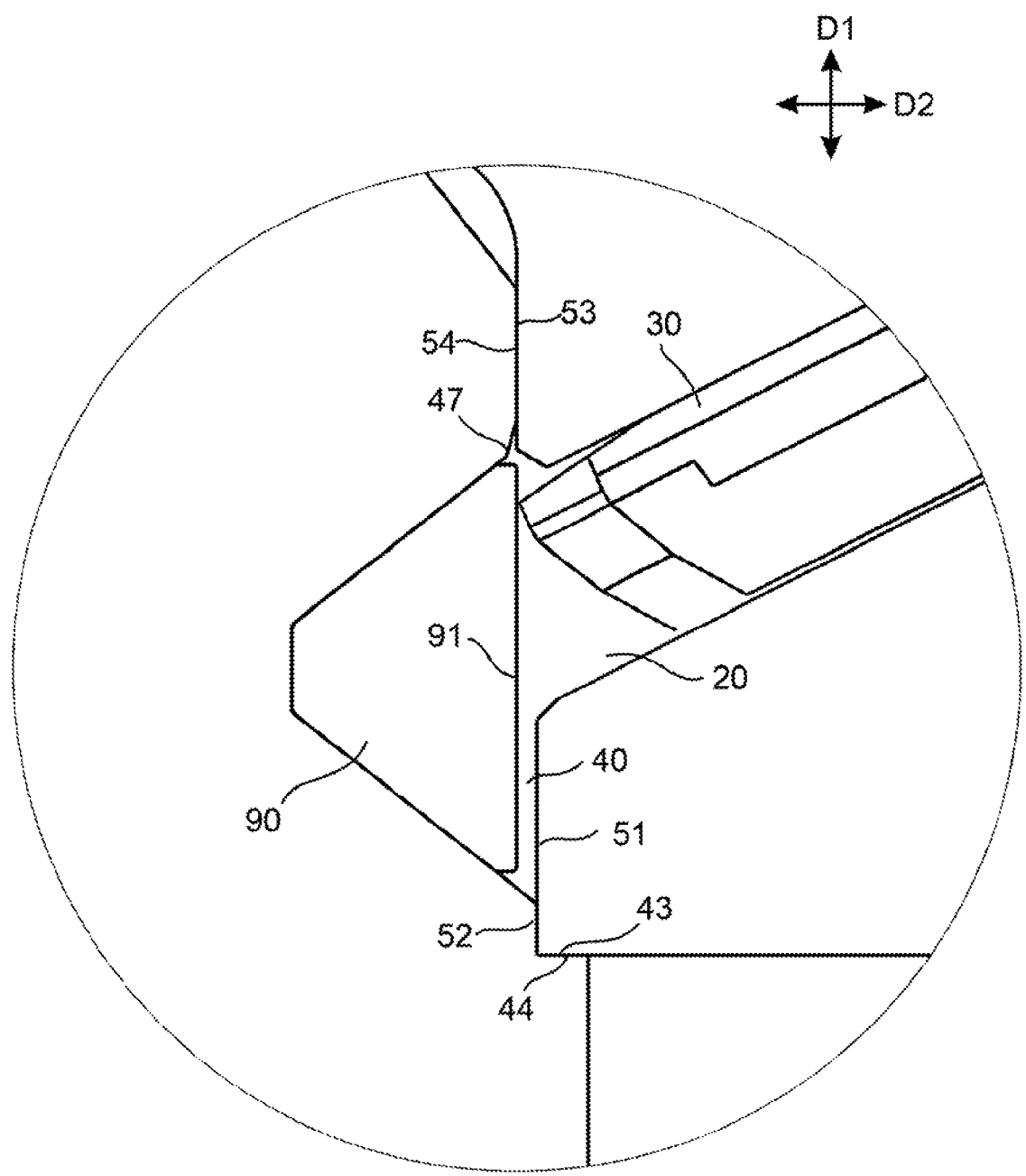
FIG. 2 shows an enlarged view of the encircled area in FIG. 1.
Figure 3A:
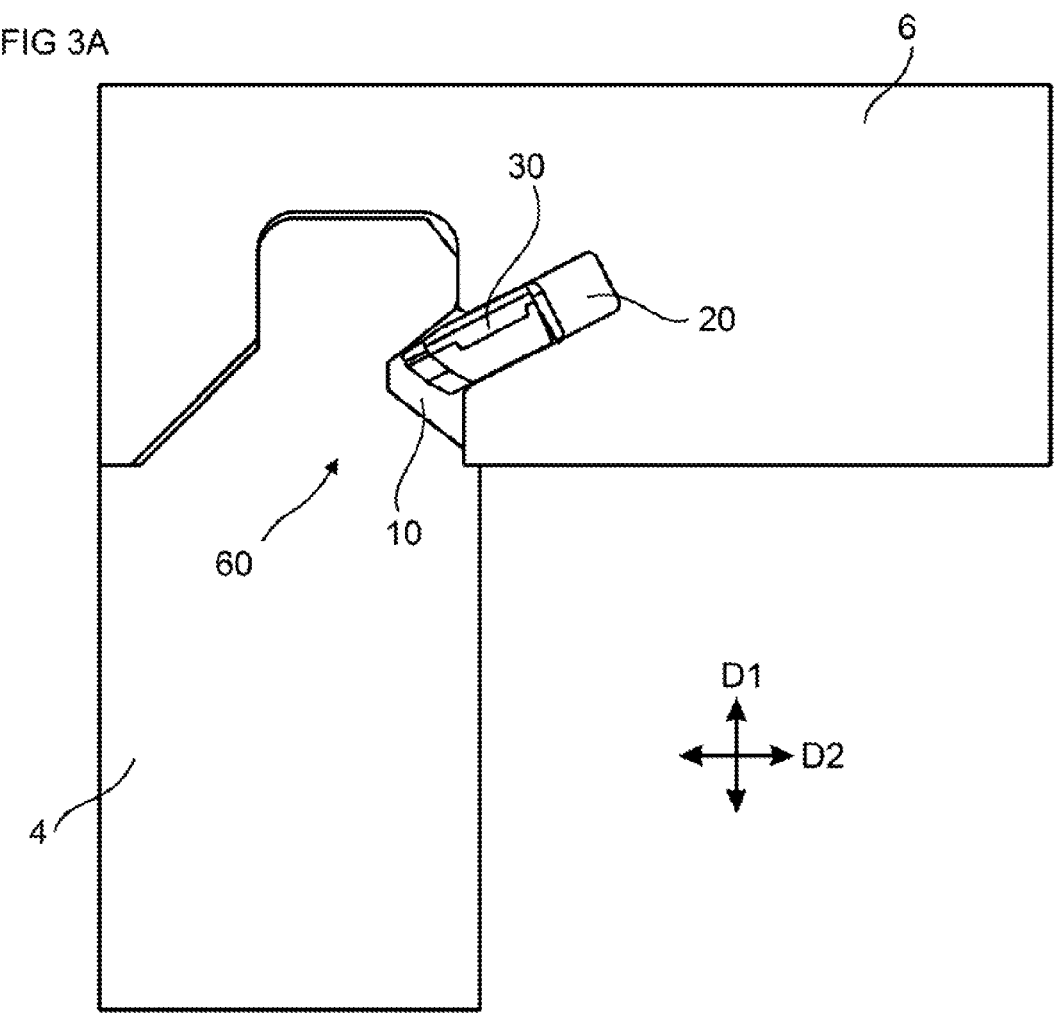
FIG. 3A shows an embodiment comprising the first panel and the second panel in a locked position.

FIG. 1 shows a disassembling of a first panel 6 from a second panel 4. The first panel 6 and the second panel 4 are provided with an embodiment of a locking device 60. The first panel 6 may be a top panel of a frame, such as a frame for a furniture product, and the second panel 4 may be a side panel of the frame. FIG. 2 shows an enlarged view of a part of the locking device 60 in a position during unlocking of the first panel 6 and the second panel 4. The first panel 6 has a first main plane and second panel 4 has a second main plane. The first main plane is essentially perpendicular to the second main plane. The locking device 60 is configured for locking a first edge of the first panel 6 to a second edge of the second panel 4, as shown in FIG. 3A. The locking device 60 comprises an edge groove 21 at the first edge and a tongue groove 10 at the second edge. The edge groove 21 comprises a flexible tongue 30 arranged in an insertion groove 20 at a first side of the edge groove 21, said flexible tongue is configured to cooperate with the tongue groove 10 for locking together the first edge and the second edge in a first direction D1 which is perpendicular to the first main plane. The first side of the edge groove 21 comprises a first groove surface 51 at a first side of the insertion groove 20 and a second groove surface 53 at a second side of the insertion groove 20, wherein the first groove surface 51 is closer to an opening of the edge groove 21 than the second groove surface 51. A first side of said second edge comprises a first edge surface 52 at a first side of the tongue groove 10 and a second edge surface 54 at a second side of the tongue groove 10. The first groove surface 51 and the first edge surface 52 are configured to cooperate for locking the first edge and the second edge in a second direction D2, which is perpendicular to the second main plane. The second groove surface 53 and the second edge surface 54 are configured to cooperate for locking the first edge and the second edge in the second direction D2.

Said locking device 60 is configured to be unlocked by inserting a tool 90 in the tongue groove 10.

The tool 90 is configured to unlock the locking device 60 by pushing the flexible tongue 30 out of the tongue groove 10 and towards a bottom of the insertion groove 20.

The tool 90 may be of an elongated shape, and FIG. 1 shows a crosscut of such a tool 90.

The first panel 6 and the second panel 4 may be a part of a furniture product, such as a frame. The tongue groove 10 may have an insertion opening at a backside of the furniture product, such that the tool 90 may be inserted in said insertion opening, and the tongue groove 10 may be covered at, or does not extend to, a front side of the furniture product. The insertion groove 20 may be positioned at other parts of the furniture product.

Figure 3B:
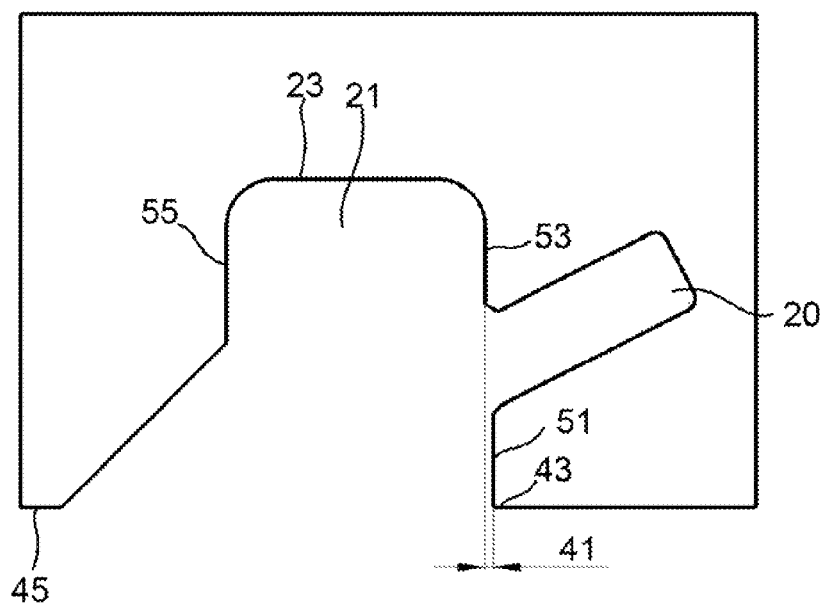
FIG. 3B shows a part of the first panel.

Said first groove surface 51 is arranged offset in the second direction D2 relative to the second groove surface 53 by a first distance 41 (see FIG. 3B). FIG. 2 shows an enlarged view of the encircled area in FIG. 1.

The first groove surface 51 and the first edge surface 52 may be parallel and preferably extend parallel to the second main plane. The second groove surface 53 and the second edge surface 54 may be parallel and preferably extend parallel to the second main plane.

The edge groove 21 may comprise, at a second side that is opposite to the first side, a third groove surface 55, which is configured to cooperate with a third edge surface 56 for locking the first edge and the second edge in the second direction D2.

The locking device 60 may comprise cooperating surfaces 45, 46 at a second side of the opening of the edge groove 21, preferably at an outer edge surface at an outer corner of the first panel and the second panel, respectively, in a locked position of the first panel and the second panel.

The first edge surface 52 may be a bottom surface of a recess 44 at the second edge. In a locked position of the first panel 6 and the second panel 4, the bottom surface is adjacent a first side 43 of an opening of the edge groove 21. A side surface of the recess 44 may be configured to cooperate with a first main surface 18 of the first panel 6.

FIG. 2 shows an embodiment of the first groove surface 51 which extends partly over the tongue groove 10. The locking device 60 is configured such that a play 40 is obtained between an outer surface 91 of the tool 90 and the first groove surface 51 when the tool 90 is inserted in the tongue groove 10. The tool 90 may have essentially the same shape as a cross section of the tongue groove 10. The outer surface of the tool 90 is preferably inline with the second edge surface 54 when the tool 90 is inserted into the tongue groove 10. The outer surface of the tool 90 may alternatively be positioned, in the second direction D2, between the first edge surface 52 and second edge surface 54.

The first panel 6 and the second panel 4 each preferably comprises four edges, a first main surface 18, 17 and a second main surface 16, 15. The first main plane is parallel to the first main surface 18 and the second main surface 16 of the first panel 6, and the second main plane is parallel to the first main surface 17 and the second main surface 15 of the second panel 4. FIG. 1 shows an embodiment wherein the first main surface 17 of the second panel 4 is arranged at an essentially perpendicular angle 5 to the first main surface 18 of the first panel 6. The first main surface 17 of the second panel 4 preferably faces the first main surface 18 of the first panel 6.

The first main surfaces 18, 16 and/or the second main surfaces 17, 15 may comprise a decorative layer (not shown).

The flexible tongue 30 is preferably displaceable in the insertion groove 20. The flexible tongue 30 and the insertion groove 20 may be designed according to the flexible tongue and the groove described and shown in FIGS. 2A-2F in WO2015/105449.

FIG. 3A shows an embodiment of the first panel 6 and the second panel 4 in a locked position. The flexible tongue 30 cooperates with the tongue groove 10 for locking the first panel 6 and the second panel 4 together.

FIG. 3B shows an embodiment of the first edge. The first groove surface 51 is arranged offset in the second direction D2 relative to the second groove surface 53 by a first distance 41. The first distance 41 may be in the range of about 0.1 mm to about 0.4 mm. Preferably, the first distance is about 0.2 mm.

Figure 4A:
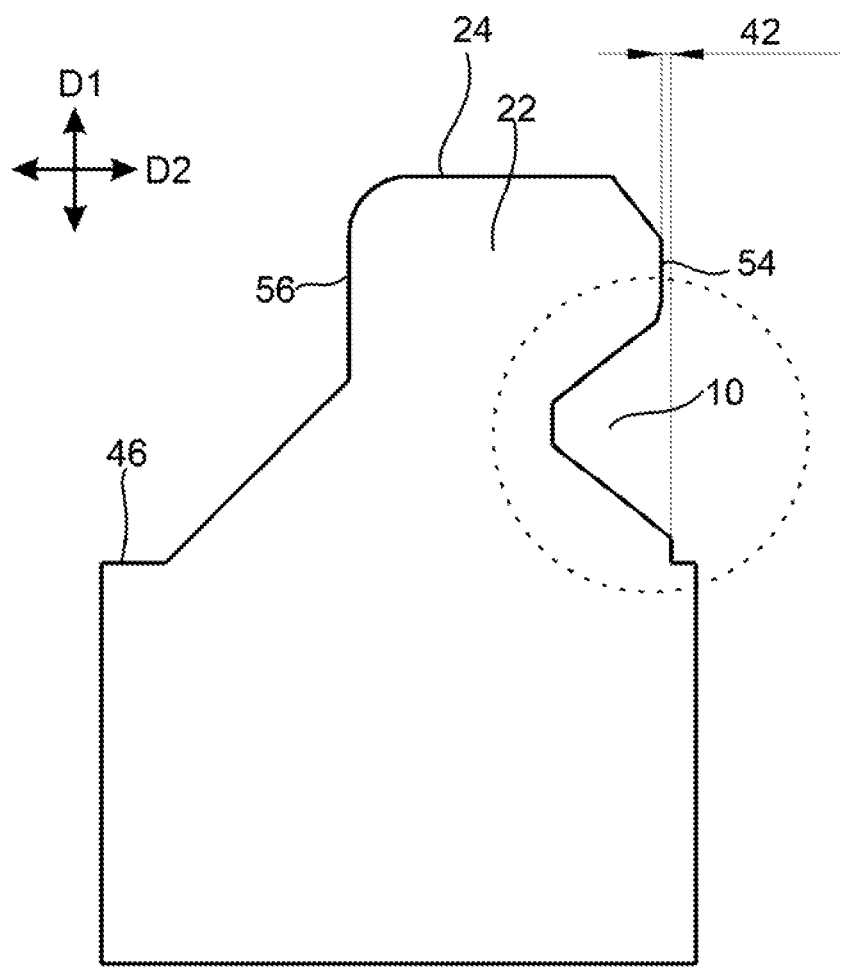
FIG. 4A shows a part of the second panel.

FIG. 4A shows an embodiment of the second edge. The first edge surface 52 is arranged offset in the second direction D2 relative to the second edge surface 54 by a second distance 42. The second distance 42 may be in the range of about 0.1 mm to about 0.4 mm. Preferably, the first distance is about 0.2 mm. The second distance 42 is preferably essentially equal to as the first distance 41. The play 40 shown in FIG. 2 is preferably essentially equal to the first distance 41.

Figure 4B:
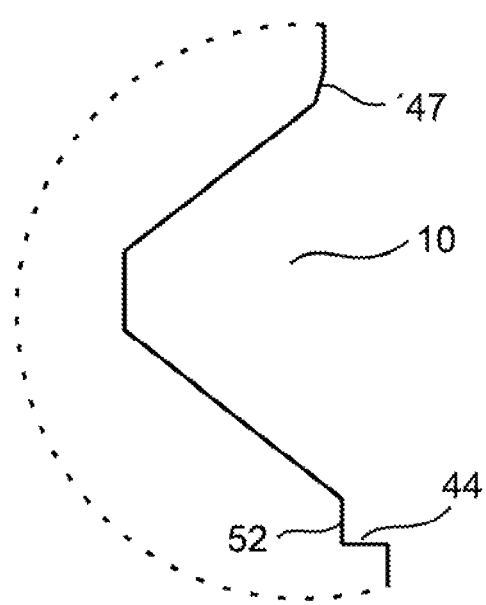
FIG. 4B shows an enlarged view of the encircled area in FIG. 4B.

FIG. 4B shows an enlarged view of the encircled area in FIG. 4A. FIG. 4B shows an embodiment of the locking device 60 comprising a bevel or rounding 47 at an opening of the tongue groove 10.

Figure 6:
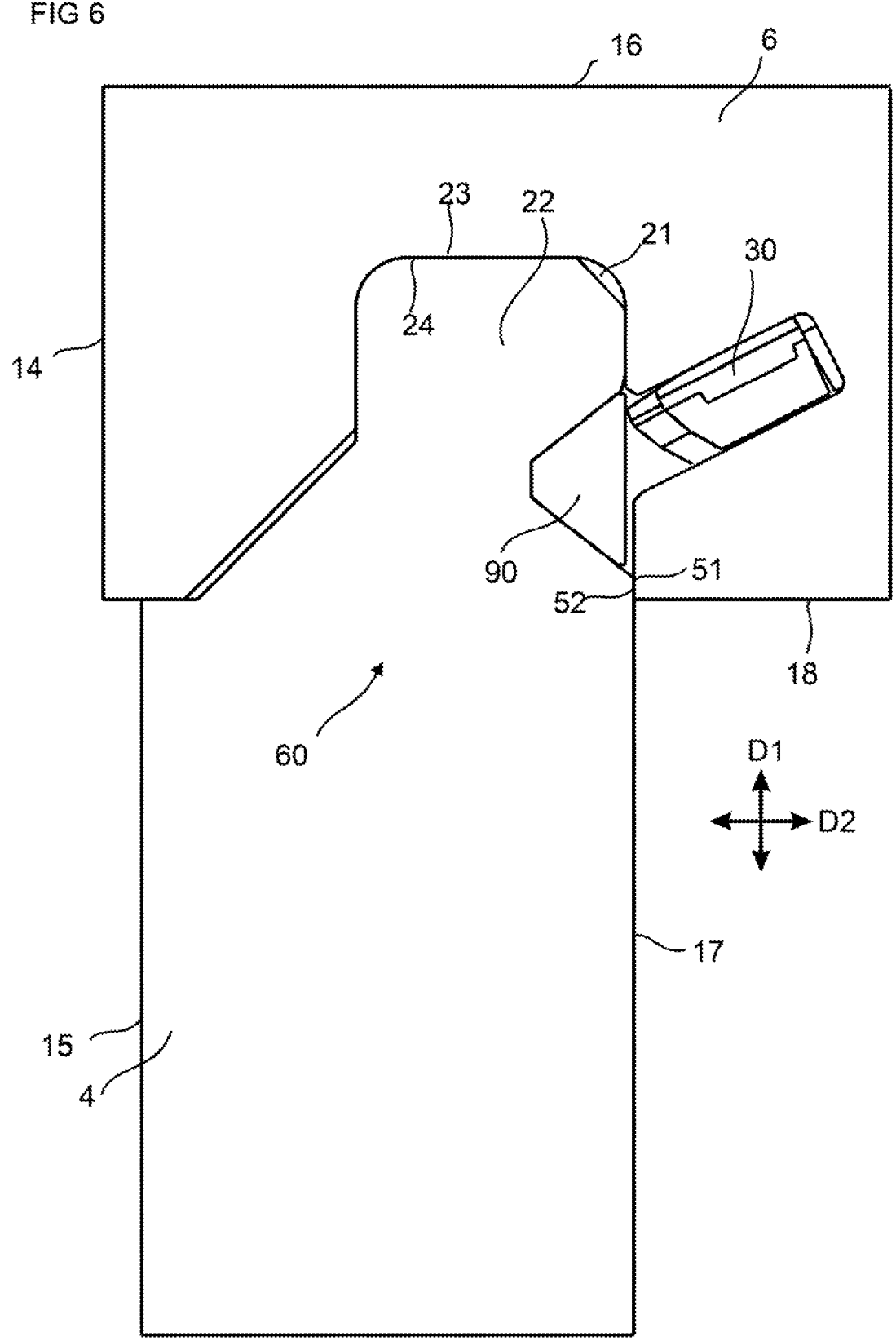
FIG. 6 shows an embodiment comprising the first panel and the second panel during unlocking with an embodiment of the tool inserted into an embodiment of the tongue groove.

FIG. 5 and FIG. 6 show embodiments wherein the first edge surface 52 is at the first main surface 17 of the second panel 4. A bottom surface 23 of the edge groove 21 may be configured to cooperate with an outer edge surface 24 of a portion 22 of the second edge for locking in the first direction D1.

FIG. 6 shows an embodiment comprising a first panel 6 extending beyond the second main surface 15 of the second panel 4. An outer edge 14 of the first panel 6 is positioned at a distance from the second main surface 15 of the second panel 4. This may be an advantage for embodiments in which the first edge surface 52 is a part of a surface that has not been worked. This may have the advantage that there is an overlap between the first panel 6 and the second panel 4, at an outer corner, even in the event that the first panel 6 is too thin, due to production tolerances being too large in the panel production.

FIG. 7 shows in a 3D-view an embodiment before the first panel 6 and the second panel 4 are assembled and locked together. The edge groove 21 extends along the first edge of the first panel 6 and in a third direction D3 which is perpendicular to the first direction D1 and the second direction D2. The tongue groove 21 extends along the second edge of the first panel 4.

Figure 8A:
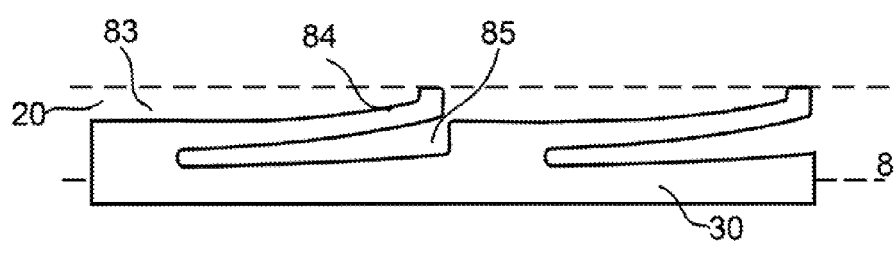
FIGS. 8A-8F show embodiments of the flexible tongue.
Figure 8B:
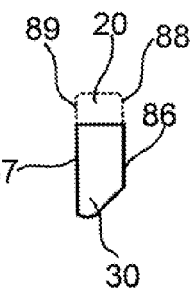
Figure 8C:
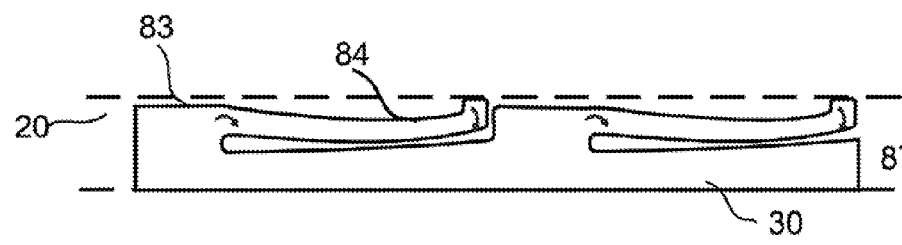
Figure 8D:
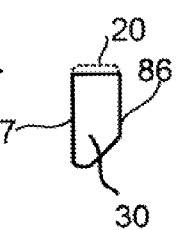

An embodiment of the flexible tongue 30, which is displaceable in an insertion groove 20, is shown in FIGS. 8A-8D. FIGS. 8A-8B show the flexible tongue 30 in a locked position and FIGS. 8C-8D show the flexible tongue 30 during assembling of the first panel 6 and the second panel 4. FIG. 8B shows a cross section of the flexible tongue 30 illustrated in FIG. 8A. FIG. 8D shows a cross section of the flexile tongue 30 illustrated in FIG. 8C. The flexible tongue 30 comprises bendable protruding parts 84. A space 83 is provided between the flexible tongue 30 and a bottom wall of the insertion groove 20. FIG. 8C shows that the flexible tongue 30 is pushed into the insertion groove 20 and towards the bottom wall of the insertion groove 20 during an assembly of the first panel 6 with the second panel 4. The flexible tongue 30 springs back toward its initial position when the first panel 6 and the second panel 4 have reached a locked position. A recess 85 is preferably arranged at each bendable protruding part 84.

The flexible tongue 30 may have a first displacement surface 86 and an opposite second displacement surface 87, configured to be displaced along a third displacement surface 88 and a fourth displacement locking surface 89, respectively, of the insertion groove 20.

Figure 8E:
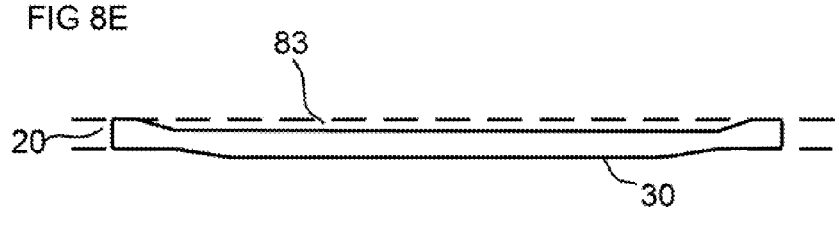
Figure 8F:
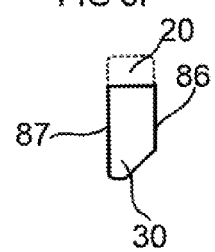

An alternative embodiment of the flexible tongue 30, without the protruding bendable parts 84, is shown in FIGS. 8E-8F. FIG. 8F shows a cross section of the flexible tongue 30 shown in FIG. 8E. The alternative embodiment is bendable in its length direction in order to accomplish the same function as the embodiment shown in FIGS. 8A-8D.

The set of panels described above may be a part of a furniture product, such as a frame.

A core material of the panels in the embodiments above preferably comprises a wood fibre based board, such as a HDF, MDF, plywood, solid wood or particleboard, a reinforced plastic board, or a wood fibre composite board.

The invention claimed is:

1. A set of panels comprising a first panel having a first main plane and a second panel having a second main plane, wherein the first panel and the second panel comprise a locking device for locking a first edge of the first panel to a second edge of the second panel, wherein the first main plane is essentially perpendicular to the second main plane in a locked position of the first panel and the second panel, the locking device comprising an edge groove at the first edge and a tongue groove at the second edge, the edge groove comprising an insertion groove at a first side of the edge groove, wherein the insertion groove comprises a flexible tongue which is configured to cooperate with the tongue groove for locking together the first edge and the second edge in a first direction which is perpendicular to the first main plane, said first side of the edge groove comprising a first groove surface at a first side of the insertion groove and a second groove surface at a second side of the insertion groove, and a first side of said second edge comprising a first edge surface at a first side of the tongue groove and a second edge surface at a second side of the tongue groove, wherein the first groove surface and the first edge surface are configured to cooperate for locking the first edge and the second edge in a second direction, which is perpendicular to the second main plane, wherein the second groove surface and the second edge surface are configured to cooperate for locking the first edge and the second edge in the second direction, said locking device configured to be unlocked by inserting a tool in the tongue groove, wherein the first groove surface is arranged offset in the second direction relative to the second groove surface by a first distance, wherein the first edge surface is arranged offset in the second direction relative the second edge surface by a second distance.

2. The set of panels as claimed in claim 1, wherein the first distance is in the range of about 0.1 mm to about 0.4 mm.

3. The set of panels as claimed in claim 1, wherein the first groove surface and the first edge surface are parallel and extend parallel to the second main plane.

4. The set of panels as claimed in claim 1, wherein the second groove surface and the second edge surface are parallel and extend parallel to the second main plane.

5. The set of panels as claimed in claim 1, wherein the edge groove comprises, at a second side that is opposite to the first side, a third groove surface, which is configured to cooperate with a third edge surface of the second edge for locking the first edge and the second edge in the second direction.

6. The set of panels as claimed in claim 1, wherein the first groove surface is, in the locked position, configured to extend partly over the tongue groove.

7. The set of panels as claimed in claim 1, wherein the first edge surface is a bottom surface of a recess at the second edge, and is positioned in the locked position adjacent a side of an opening of the edge groove.

8. The set of panels as claimed in claim 7, wherein a side surface of the recess is configured to cooperate with a first main surface of the first panel.

9. The set of panels as claimed in claim 1, wherein the first edge surface is at a first main surface of the second panel.

10. The set of panels as claimed in claim 9, wherein a bottom surface of the edge groove is configured to cooperate with an outer edge surface of the second edge for locking in the first direction.

11. The set of panels as claimed in claim 1, wherein the locking device comprises cooperating surfaces at a second side of an opening of the edge groove, at an outer edge surface at an outer corner of the first panel and at the second panel, respectively, in the locked position.

12. The set of panels as claimed in claim 1, wherein the locking device comprises a bevel at an opening of the tongue groove.

13. The set of panels as claimed in claim 1, wherein the locking device is configured such that a play is obtained between an outer surface of the tool and the first groove surface when the tool is inserted in the tongue groove.

14. The set of panels as claimed in claim 1, wherein a cross section of the tool has essentially the same shape as a cross section of the tongue groove.

15. The set of panels as claimed in claim 1, wherein the second distance is essentially equal to the first distance.

16. The set of panels as claimed in claim 13, wherein the amount of play is essentially equal to the first distance.

17. A set of panels comprising a first panel having a first main plane and a second panel having a second main plane, wherein the first panel and the second panel comprise a locking device for locking a first edge of the first panel to a second edge of the second panel, wherein the first main plane is essentially perpendicular to the second main plane in a locked position of the first panel and the second panel, the locking device comprising an edge groove at the first edge and a tongue groove at the second edge, the edge groove comprising an insertion groove at a first side of the edge groove, wherein the insertion groove comprises a flexible tongue which is configured to cooperate with the tongue groove for locking together the first edge and the second edge in a first direction which is perpendicular to the first main plane, said first side of the edge groove comprising a first groove surface at a first side of the insertion groove and a second groove surface at a second side of the insertion groove, and a first side of said second edge comprising a first edge surface at a first side of the tongue groove and a second edge surface at a second side of the tongue groove, wherein the first groove surface and the first edge surface are configured to cooperate for locking the first edge and the second edge in a second direction, which is perpendicular to the second main plane, wherein the second groove surface and the second edge surface are configured to cooperate for locking the first edge and the second edge in the second direction, said locking device configured to be unlocked by inserting a tool in the tongue groove, wherein the first groove surface is arranged offset in the second direction relative to the second groove surface by a first distance, wherein the first edge surface is arranged offset in the second direction relative the second edge surface by a second distance, wherein the second distance is essentially equal to the first distance, wherein the locking device is configured such that a play is obtained between an outer surface of the tool and the first groove surface when the tool is inserted in the tongue groove.

18. The set of panels as claimed in claim 17, wherein the amount of play is essentially equal to the first distance.

* * * * *